United States Patent
Khoury (10) Patent No.: US 9,407,823 B2
(45) Date of Patent: Aug. 2, 2016

(54) HANDLING VIDEO FRAMES COMPROMISED BY CAMERA MOTION

(71) Applicant: Microsoft Corporation, Redmond, WA (US)

(72) Inventor: Issa Khoury, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 14/100,189

(22) Filed: Dec. 9, 2013

(65) Prior Publication Data

US 2015/0163407 A1    Jun. 11, 2015

(51) Int. Cl.
  *H04N 5/232*    (2006.01)
  *G11B 27/02*    (2006.01)
  *H04N 5/77*    (2006.01)

(52) U.S. Cl.
  CPC ............ *H04N 5/23267* (2013.01); *G11B 27/02* (2013.01); *H04N 5/2328* (2013.01); *H04N 5/23222* (2013.01); *H04N 5/23245* (2013.01); *H04N 5/23251* (2013.01); *H04N 5/23254* (2013.01); *H04N 5/23258* (2013.01); *H04N 5/772* (2013.01)

(58) Field of Classification Search
  CPC . H04N 5/23267; H04N 5/772; H04N 5/2328; H04N 5/23258; H04N 5/23254; H04N 5/23251; H04N 5/23245; H04N 5/23222; G11B 27/02
  See application file for complete search history.

(56) References Cited

U.S. PATENT DOCUMENTS

| | | | |
|---|---|---|---|
| 7,546,026 B2 | 6/2009 | Pertsel | |
| 7,593,026 B2 * | 9/2009 | Turner | G09B 9/307 345/3.1 |
| 7,917,020 B2 * | 3/2011 | Murata | H04N 5/772 348/231.3 |
| 8,063,942 B2 | 11/2011 | Hung | |

(Continued)

FOREIGN PATENT DOCUMENTS

| | | |
|---|---|---|
| WO | 2008/064270 A2 | 5/2008 |
| WO | 2011/053374 A1 | 5/2011 |

OTHER PUBLICATIONS

"International Search Report & Written Opinion for PCT Application No. PCT/US2014/068679", Mailed Date: Jun. 15, 2015, 19 Pages.

(Continued)

*Primary Examiner* — Nicholas Giles
(74) *Attorney, Agent, or Firm* — Judy Yee; Micky Minhas (57) ABSTRACT

Example embodiments concern reducing the negative impacts of camera motion during video capture. Processing, transmitting, or displaying motion compromised video data yields inefficient use of bandwidth, battery power, memory, and other resources. Watching video acquired from a moving video camera may induce motion sickness. Unlike conventional systems that attempt to address motion by increasing frame capture rates to produce better individual frames, example embodiments identify frames that are compromised by motion data and do not provide or present them for viewing. Compromised frames may be logically or physically deleted from a video stream or memory. Motion may be detected by physical apparatus (e.g., accelerometer) or through image processing (e.g., motion artifacts, low correlation between frames, low signal-to-noise ratio). A display device may be controlled to operate in a video display mode or a still frame mode depending on motion detected in captured video frames.

12 Claims, 8 Drawing Sheets

(56) References Cited

U.S. PATENT DOCUMENTS

| | | |
|---|---|---|
| 8,311,385 B2 | 11/2012 | Lee |
| 9,001,155 B2* | 4/2015 | Tamaru .................. G02B 27/01 345/633 |
| 2002/0080881 A1* | 6/2002 | Honda .................. H04N 19/172 375/240.16 |
| 2006/0256140 A1* | 11/2006 | Turner .................. G09B 9/307 345/690 |
| 2006/0291840 A1* | 12/2006 | Murata .................. H04N 5/772 396/50 |
| 2010/0231738 A1 | 9/2010 | Border et al. |
| 2010/0265344 A1 | 10/2010 | Velarde |
| 2011/0109758 A1 | 5/2011 | Liang |
| 2012/0057029 A1 | 3/2012 | Border |
| 2012/0148216 A1 | 6/2012 | Pavagada et al. |
| 2012/0242853 A1 | 9/2012 | Jasinski et al. |
| 2012/0307086 A1 | 12/2012 | Jefremov |
| 2013/0127980 A1* | 5/2013 | Haddick .................. G06F 3/013 348/14.08 |
| 2013/0241955 A1* | 9/2013 | Tamaru .................. G02B 27/01 345/633 |
| 2013/0242120 A1 | 9/2013 | Venkatraman |
| 2013/0335301 A1* | 12/2013 | Wong .................. G02B 27/0093 345/8 |
| 2014/0176722 A1* | 6/2014 | Sashida ................ H04N 5/2259 348/158 |
| 2015/0124101 A1* | 5/2015 | Izumihara .......... H04N 5/23219 348/158 |
| 2015/0124111 A1* | 5/2015 | Izumihara .......... G06K 9/00335 348/211.99 |

OTHER PUBLICATIONS

"International Preliminary Report on Patentability Issued in PCT Application No. PCT/US2014/068679", Mailed Date: Mar. 16, 2016, 9 Pages.

"Second Written Opinion Issued in PCT Application No. PCT/US2014/068679", Mailed Date: Nov. 3, 2015, 8 Pages.

* cited by examiner

HANDLING VIDEO FRAMES COMPROMISED BY CAMERA MOTION

BACKGROUND

Video cameras on mobile devices are nearly ubiquitous. With so many cameras being used, there are large numbers of videos being captured and then viewed. Video may be captured and viewed in different scenarios. For example, a user may capture a video on their smart phone and then watch their own video. In "see-what-I-see" mode, a user may capture a video on their smart phone and then transmit it to someone else to watch, perhaps in real-time as events are unfolding. Additionally, video cameras may be used for other real-time applications including video calling. Unlike cameras fixed on a tripod or even webcams that are relatively motionless on a laptop, mobile phones tend to move significantly while capturing videos, particularly in the see-what-I-see scenario.

Video cameras that are moving may produce videos that yield a sub-optimal viewing experience. The video that is captured may include significant noise or significant artifacts due to the movement of the camera. The amount of noise and the significance of the artifacts may be related to the frame capture rate and encoding speed. When the camera is moving faster than a threshold speed, then the frame capture rate, encoding, and transmission may not be able to account for the device motion. The video produced when the frame capture rate, encoding, and transmission cannot keep up with the moving camera may be unpleasant to view for different reasons. In some cases, a viewer may even become motion sick if they attempt to watch the video. Although the video may be substantially unwatchable, the video still consumes memory when stored on the capturing device, still consumes processor cycles when encoded or decoded, still consumes bandwidth when transmitted, and still consumes memory on a receiving device.

Both memory and bandwidth are finite resources. Consuming finite resources with substantially worthless video is inefficient. Additionally, bandwidth may be expensive, particularly when the video is being transmitted over a cellular network, satellite network, or other network. Users may be disappointed to learn they have paid for the transmission or receipt of substantially worthless video that makes them seasick. Capturing, storing, and transmitting video also consumes other resources like battery power on a smart phone. The battery power may be consumed by the device processor encoding/decoding a video stream that has an undesirable signal-to-noise (SNR) ratio. Users may be disappointed to waste their battery power on an unwatchable video.

Conventionally, when a camera detects that it is moving while capturing video, the camera may increase its frame capture rate or other capture parameters in an attempt to mitigate motion artifacts in individual frames. Improving the frame capture rate may freeze the moving scenery better, with higher fidelity, but may do nothing to address the motion sickness phenomenon. While blurring or artifacts may be mitigated by a higher capture rate, the motion sickness induced by watching such a video may actually be increased. When a camera increases its frame capture rate, additional memory may be required and additional coding and decoding may be required. Additionally, more frames may be sent between a capturing device and a viewing device. Thus, increasing the frame capture rate when camera motion is detected may actually exacerbate problems associated with a moving camera. For example, more memory may be used, more battery power may be used, and more bandwidth may be consumed, all to produce a video that is still substantially worthless or that makes a viewer motion sick.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed toward providing an improved viewing experience for videos that may be affected by camera motion. Frames that may be compromised by video motion may be handled differently than frames that are not compromised by video motion. Frames may be identified as being compromised based on sensor data (e.g., gyroscope, accelerometer) from a camera, based on frame-to-frame analysis (e.g., registration), based on in-frame analysis (e.g., blurring), or in other ways. Once a frame has been identified as being compromised, a decision may be made to exclude that frame from a presentation. When a threshold number of frames are compromised within a certain period of time, the presentation may be switched to a still frame mode that does not try to hide the fact that some frames are being dropped. Instead, the still frame mode may present a last non-compromised frame for a pre-determined interval (e.g., half a second) or may present selected non-compromised frames in a slide show format with pleasing visual effect transitions between frames. Once a threshold number of non-compromised frames are detected within a certain time period, the presentation may switch back to video mode.

Some embodiments of example apparatus may include a set of logics (e.g., circuits) that control an apparatus associated with a video camera. The apparatus may analyze camera motion and make decisions concerning video frames based, at least in part, on the camera motion. For example, frames that are acquired while the camera is moving more than a movement threshold amount may not be stored in memory or, if the frames are stored in memory then the frames may be marked with a motion flag or excluded from a playlist. Frames that are marked as having been acquired while the camera is moving may not be encoded or decoded or transmitted from the acquiring device to another device for display. The apparatus may manipulate how frames are displayed based, at least in part, on the motion detected during video capture. For example, if the camera is moving so much that there are only short periods where the displayed video image would be stable and free from motion artifacts, then the apparatus may stop trying to display video and instead may display still images that satisfy a viewing standard.

BRIEF DESCRIPTION OF THE DRAWINGS

The accompanying drawings illustrate various example apparatus, methods, and other embodiments described herein. It will be appreciated that the Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods address issues created when a video camera is moving while capturing frames. Unlike conventional systems that increase frame capture rates when camera motion is detected and thereby consume additional resources, example apparatus and methods seek to reduce resource consumption by taking a different approach. Rather than capturing more frames, example apparatus and methods may respond to camera motion by only displaying frames that are affected less than a threshold amount by camera motion. Additionally, rather than speeding up the camera, example apparatus and methods may slow down the camera while motion is detected and change the camera so that still frames suitable for a slide show presentation instead of a video presentation may be acquired.

Figure 1:
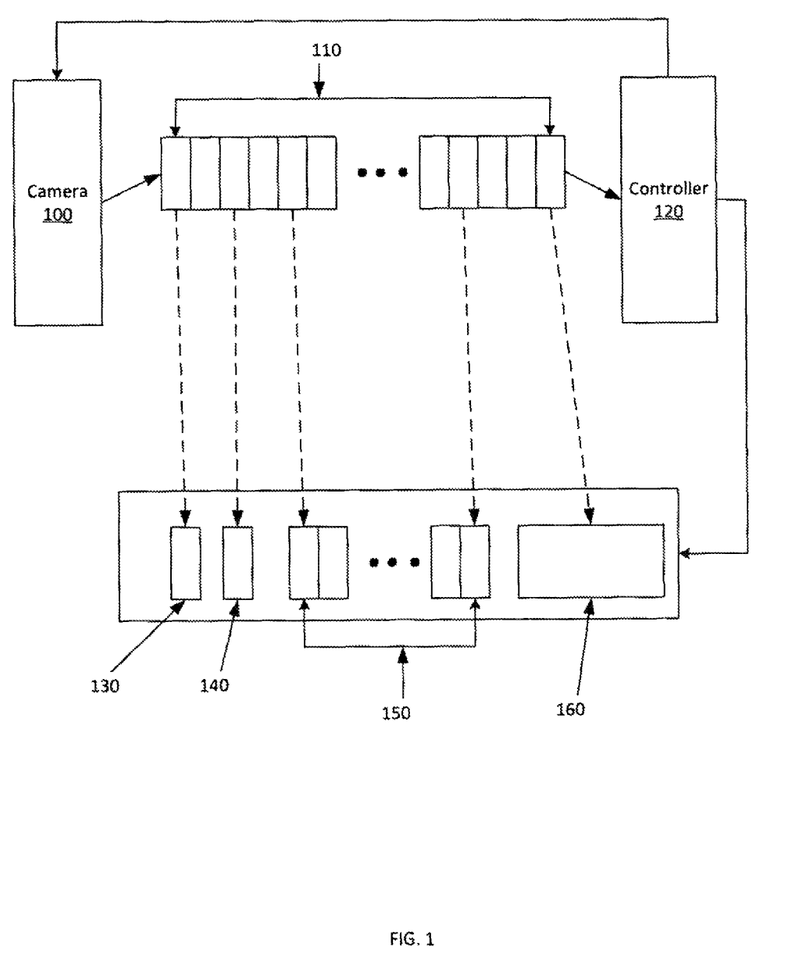
FIG. 1 illustrates a camera producing a stream of video frames and an example controller handling frames that are compromised by camera motion.

FIG. 1 illustrates a camera 100 that is producing a stream 110 of video frames. The stream 110 of video frames is processed by a controller 120. Controller 120 may identify frames in stream 110 that are undesirably affected by motion of camera 100. Frames that are deemed viewable may be presented while frames that are deemed un-viewable may not be presented. A frame may be deemed viewable if the frame exhibits less than a threshold amount of damage due to motion of the camera 100. The damage may be identified by a signal-to-noise ratio (SNR), an amount of blurring, a motion artifact, or other criteria.

Controller 120 may present a single frame 130 that was deemed viewable, and then may skip a number of frames that were deemed un-viewable before presenting another single frame 140. In one embodiment, single frame 130 may be displayed for a pre-determined period of time (e.g., one second) or may be displayed until the next viewable frame 140 is provided. Controller 120 may then provide a clip 150. Clip 150 may include a series of contiguous frames that were acquired while camera 100 was moving less than a threshold amount. After the dip 150 has been provided, controller 120 may then provide a single frame 160. Frame 160 may be presented for a lengthy period of time (e.g., until another viewable frame is provided). In addition to controlling which frames are provided for viewing, controller 120 may also provide a control signal to camera 100. The control signal may, for example, determine whether camera 100 continues to try to acquire video data or whether camera 100 will acquire still frames.

Figure 2:
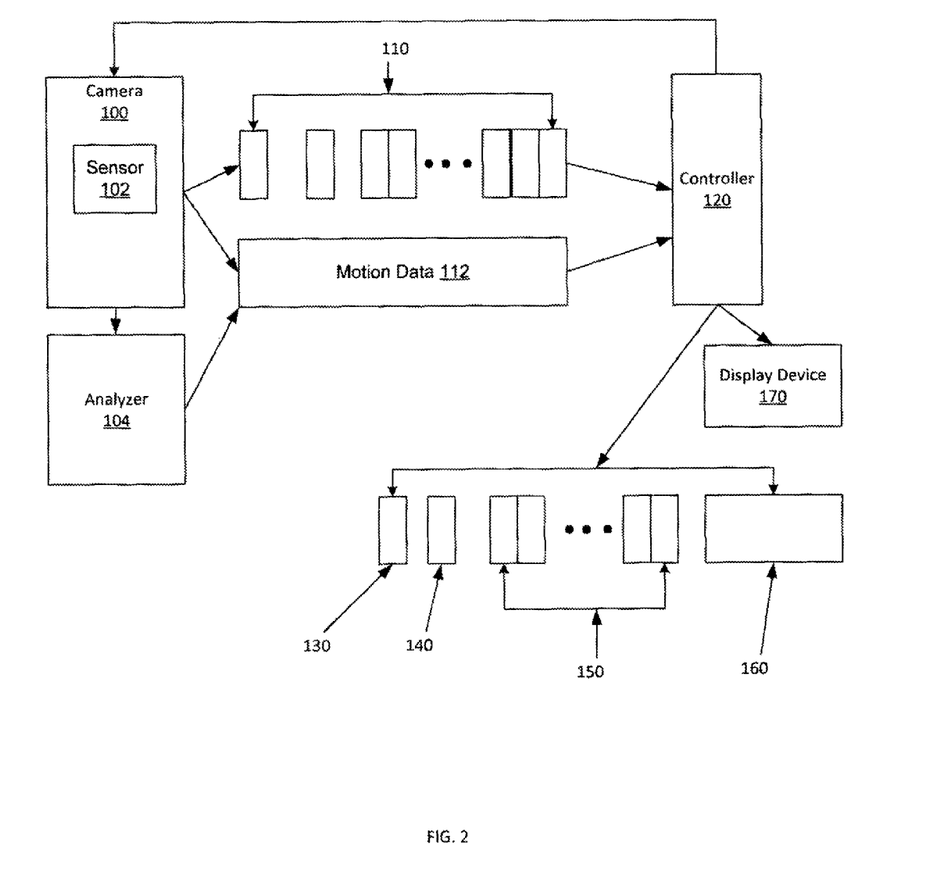
FIG. 2 illustrates an example presentation stream including video data and still frames.

FIG. 2 illustrates a sensor 102 in camera 100. Sensor 102 may be, for example, a gyroscope, an accelerometer, or other electrical, mechanical, or electronic device from which the motion of camera 100 can be determined. Camera 100 may produce motion data 112 that is related to frames in stream 110. Camera 100 may also provide data to analyzer 104. Analyzer 104 may produce, alter, or otherwise manipulate the motion data 112. For example, the sensor 102 may provide raw accelerometer data to motion data 112 while the analyzer 104 may provide a provide/do-not-provide value to motion data 112.

Controller 120 may receive the stream 110 and decide which frames, if any, to provide for viewing based, at least in part, on the motion data 112. Controller 120 may provide the frames (e.g., 130, 140, 150, 160) for viewing or may provide frames or control information to a display device 170. Display device 170 may determine which frames provided by controller 120 to display. Display device 170 may also decide how to format frames that display device 170 presents.

Consider the following scenario. A user is holding their smart phone in their hand while watching a soccer game. Before the game starts, the user may take a panoramic video of the stadium to show their surroundings. If the user moves the camera in a gentle arc with no sudden accelerations or decelerations then the video may be watchable. Just as the game is about to start, the user may stand motionless and hold the camera motionless on the center circle where the center forward is waiting for the signal to begin the game. Since the user is motionless and since there is no action, once again the video may be acceptable for viewing.

However, once the game starts, the video may become difficult to watch if the user is moving around. For example, if the user is stamping their feet to cheer on their team then the camera may be experiencing sudden accelerations. Much of the video may be viewable, but the frames acquired during the shock when the user's foot hits the concrete stands may be compromised. Example apparatus and methods may drop those compromised frames while providing the other frames that are smooth video.

During the game, there may be a set piece play on a free kick. The user may zoom in to capture the action more quickly. The quick zoom may produce apparent motion that makes the video very difficult to watch. Once again, example apparatus and methods may drop these frames.

During the game, there may also be an end-to-end rush by a fast player. The user may attempt to pan the camera to follow the action. However, the user may not be able to pan smoothly which produces a number of frames that are blurred. Or, there could be so much movement in the footage that it is hard to watch the video without getting dizzy. Rather than present the blurry frames or frames that induce dizziness, example apparatus and methods may drop those frames.

Dropping a frame may occur at the camera or at a display. In the case of a smart phone or other handheld device the display may also be on the camera. Dropping a frame may include not storing the frame in memory, removing the frame from memory, or marking a frame in memory as compromised. Dropping a frame may also include not transmitting the frame from one device to another.

When frames are dropped, a decision may be made concerning how to fill the empty space. In one embodiment, the last frame received may be displayed until another frame is received. In another embodiment, received frames may be buffered or otherwise stored and then displayed in a slide show fashion with designed transitions.

Video presented in this scenario may be easier to watch. The video may include a series of still frames selected from clips that would be unwatchable or at least unpleasant to watch. Dropping frames may reduce memory requirements, reduce processing performed, and reduce the amount of data transmitted over a network. For a cellular telephone, reducing the amount of data transmitted may yield savings in battery power and savings in bandwidth consumed.

Consider a more extreme scenario, where a user is wearing the camera, or the camera is mounted on a bicycle, kayak, parachute harness, rock climbing helmet, or other piece of equipment that is certain to generate significant motion. In this scenario, either the camera that is capturing the video can identify frames that will not be stored or transmitted to a viewing device, or the camera that is capturing the video can identify frames that a viewing device may wish to remove.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
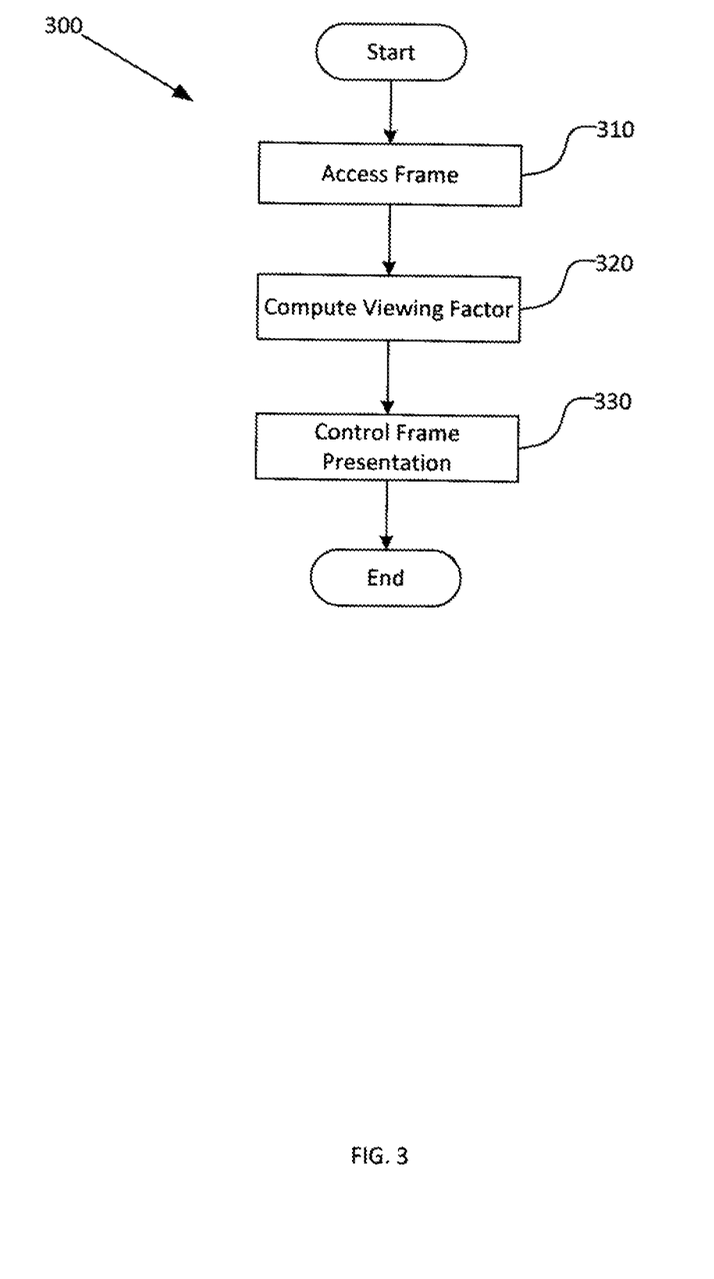
FIG. 3 illustrates an example method associated with handling video frames compromised by camera motion.

FIG. 3 illustrates an example method 300 associated with handling video frames compromised by camera motion. Method 300 includes, at 310, accessing a frame captured by a video camera. The camera may be a smartphone camera, (e.g., part of the smartphone device), a camera in a tablet, a camera in a personal computer, a camera in a personal digital assistant, or other camera. In one embodiment, the camera may be a stand alone camera that stores images for download or upload. In another embodiment, the camera may be a directly connected to the cloud and configured to stream live video. In one embodiment, the camera may be connected wirelessly to a smartphone, tablet, computer, or other internet connected device that streams the video. Accessing a frame captured by a video camera may include examining the contents of memory, receiving a pointer to memory, receiving a binary large object, receiving an object, or other action. Accessing a frame captured by a video camera may include accessing memory or data stored on a device that captured the frame or accessing memory or data on another device that did not capture the frame. Accessing the frame may include receiving the frame in a stream of frames, receiving the frame as a single frame, parsing the frame from a collection of frames, or other actions.

Method 300 also includes, at 320, determining or computing a viewing factor for the frame as a function of motion of the video camera at the time the frame was captured. In one embodiment, the motion of the video camera is determined from accelerometer data associated with the video camera at the time the frame was captured. In another embodiment, the motion of the video camera is determined from gyroscopic data associated with the video camera at the time the frame was captured. While sensors on the camera may provide some information from which motion can be identified, the captured frames may also provide data from which motion can be identified. In one embodiment, the motion of the video camera is determined from single frame motion analysis data associated with the frame. In another embodiment, the motion of the video camera is determined from frame-to-frame motion analysis data associated with the frame and one or more other frames acquired from the video camera. In different embodiments, different permutations and combinations of accelerometer, gyroscopic, single frame, and frame-to-frame data may be used to identify camera motion.

In one embodiment, upon determining that the viewing factor does not satisfy a viewing standard, the frame may be replaced with a previously acquired frame that did satisfy the viewing standard. The viewing standard may describe, for example, an acceptable signal to noise ratio (SNR), an acceptable number of motion artifacts, an acceptable percentage of the image compromised by motion, a degree to which the frame has been compromised, or other information. The replacement may be physical where bits representing the previously acquired frame are used to overwrite the frame or may be logical where a pointer to the frame is replaced with a pointer to the previously acquired frame. The replacement may be made in a memory where frames are stored, may be made in a stream of frames being provided from a source (e.g., camera) to a destination (e.g., display), or may be made in other ways. In one embodiment, to conserve memory or bandwidth, the previously acquired frame may be compressed into a compressed frame before replacing the compromised frame. In different embodiments, the replacement may be performed at the camera, at a device streaming video on behalf of the camera, or at a device displaying the video.

In one embodiment, upon determining that the viewing factor does not satisfy a viewing standard, method 300 may provide a signal that indicates that the frame does not satisfy the viewing standard. The signal may be associated with the frame by storing a value in memory, may be placed in an outbound video stream, may be provided on a channel separate from the channel on which frames are being provided, may take the form of an interrupt to an encoder/decoder processing the frame, or may be provided in other ways. Thus, rather than sending the last acceptable frame multiple times, the sending device may send the last acceptable frame once and then send a signal that the receiving device can use to enter slide show mode.

Method 300 also includes, at 330, controlling how the frame will be presented. Controlling how the frame will be presented for viewing may be a function of the viewing factor. Controlling how the frame will be presented may include controlling whether the video camera will operate in a video camera mode or will operate in a still frame mode. In one embodiment, the video camera mode and the still frame mode may control how images are acquired and displayed. For example, operating in the still frame mode may include adjusting a frame capture rate for the video camera to below twenty four frames per second and adjusting a shutter speed for the video camera to faster than 1/500 second. In another example, operating in the video camera mode may include adjusting a frame capture rate for the video camera to at least twenty four frames per second and adjusting a shutter speed for the video camera to slower than 1/500 second. Other frame capture rates and shutter speeds may be employed.

In one embodiment, controlling how the frame will be presented for viewing includes controlling whether the frame will be transmitted from an apparatus that captured the frame. If the frame is not going to be presented, the frame may not be transmitted from the capturing device to a display device or processing device. In one embodiment, controlling how the frame will be presented for viewing includes deleting the frame from a memory. The deletion may be physical where the bits representing the frame are actually zeroed or otherwise manipulated. The deletion may be logical where a pointer to the bits representing the frame is deleted or manipulated, where membership in a display list is removed, or where other physical actions that prevent the bits that represent the image from being accessed are taken.

Various actions described in method 300 may be performed on different apparatus. For example, accessing the frame at 310 may occur on a first apparatus that captured the frame or on a second apparatus that did not capture the frame. Similarly, determining the viewing factor may occur on the first apparatus or on an apparatus that did not capture the frame. Additionally, controlling how the frame will be presented may occur on the first apparatus or on another apparatus. For example, one device may send a video stream with motion noise. A second device may be able to correct for the motion and thus show the observer a better view. The second device may replace segments that make a viewer dizzy or sick with nicer, smoother, slower transitions. By way of illustration, a user may take video on a first phone that produces unacceptable motion noise. The video may be sent to a second smarter phone that is able to clean up the view and present something pleasant.

Figure 4:
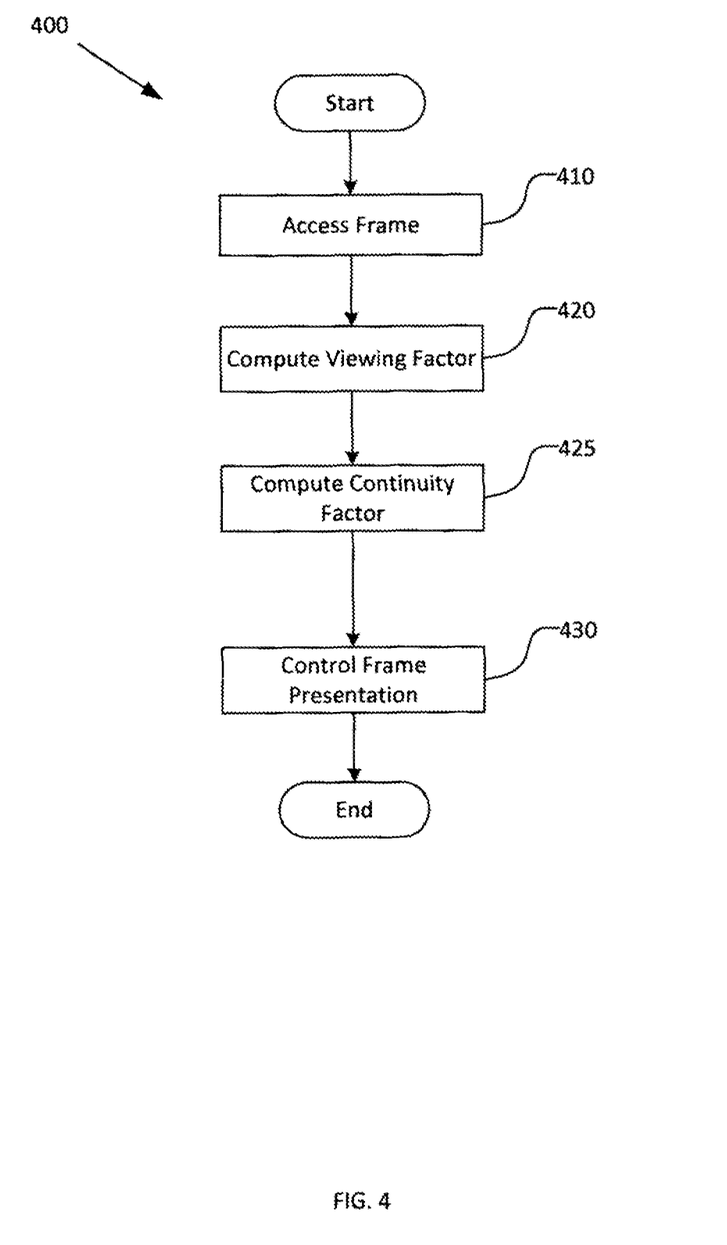
FIG. 4 illustrates an example method associated with handling video frames compromised by camera motion.

FIG. 4 illustrates an example method 400 that includes some actions similar to those found in method 300. Method 400 includes accessing a frame at 410, determining or computing a viewing factor at 420, and controlling how the frame will be presented for viewing at 430. However, method 400 includes additional actions.

For example, method 400 includes, at 425, computing a continuity factor for a series of frames captured by the video camera. The continuity factor may be based, at least in part, on the viewing factor for members of the series of frames. Like the viewing factor may be used to control the presentation of a single frame, the continuity factor may be used to control the presentation of a series of frames. In one embodiment, upon determining that the continuity factor does not satisfy a continuity standard, method 400 may control a device that would have displayed the series of frames if the continuity factor did satisfy the continuity standard to enter a still frame display mode. Additionally, method 400 may include controlling the device to enter a video display mode upon determining that the continuity factor does satisfy the continuity standard.

In one embodiment, the still frame display mode is configured to selectively display a single frame that satisfies the viewing standard as the single frame becomes available. To prevent a choppy or jittery viewing experience, the single frame may be displayed for at least a pre-determined single frame period of time (e.g., 0.1 second, 0.25 second, 0.5 second, 1 second). In one embodiment, when still frames are being displayed as they become available, the single frame mode may include connecting frames by seguing between frames using various video effects (e.g., fade-in, fade-out, dissolve, enter left, exit right). In another embodiment, the still frame display mode may be configured to display a previously provided frame that satisfied the viewing standard until the continuity standard is satisfied. This may resemble a "freeze frame" mode where the last frame that satisfied the viewing factor in a series of frames that satisfied the continuity factor is displayed until the next frame that satisfies the viewing factor in a series of frames that satisfy the continuity factor is provided. Method 300 or 400 may both include, upon determining that motion has reduced below a threshold, automatically returning to a video mode.

While FIGS. 3 and 4 illustrate various actions occurring in serial, it is to be appreciated that various actions illustrated in FIGS. 3 and 4 could occur substantially in parallel. By way of illustration, a first process could access frames, a second process could determine viewing and continuity factors, a third process could control camera operation, and a fourth process could control display operation. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 300 or method 400. While executable instructions associated with the listed methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

Figure 5:
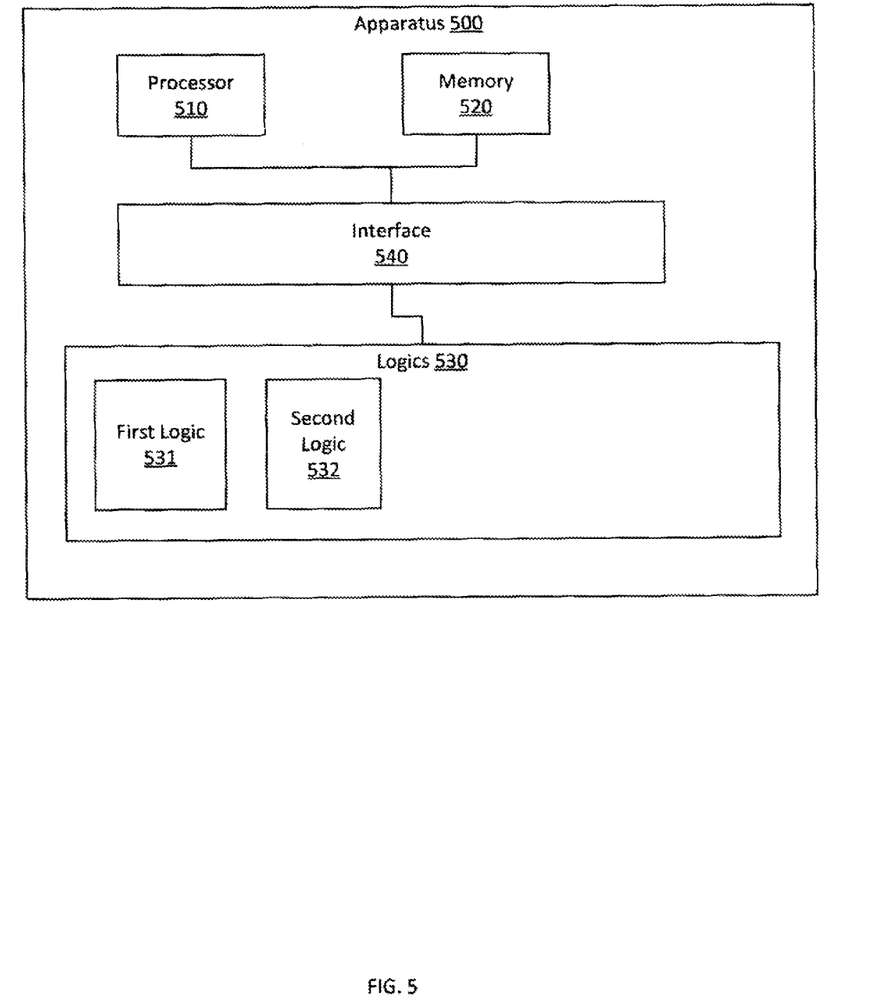
FIG. 5 illustrates an example apparatus associated with handling video frames compromised by camera motion.

FIG. 5 illustrates an apparatus 500 associated with handling video frames compromised by camera motion. In one example, the apparatus 500 includes an interface 540 configured to connect a processor 510, a memory 520, and a set of logics 530. Elements of the apparatus 500 may be configured to communicate with each other, but not all connections have been shown for clarity of illustration.

Apparatus 500 may include a processor 510. Processor 510 may be, for example, a signal processor, a microprocessor, an application specific integrated circuit (ASIC), or other control and processing logic circuitry for performing tasks including signal coding, data processing, input/output processing, power control, or other functions. Processor 510 may be configured to perform actions that support processing performed by the set of logics 530.

Apparatus 500 may include a memory 520. Memory 520 may include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 520 may be configured to store a set of frames acquired by a video camera, to store individual frames acquired by a camera, or to store metadata about frames. The metadata may include, for example, sensor data for a frame, motion analysis data for a frame, an include/exclude value, or other value.

In one embodiment, the apparatus 500 may be a general purpose computer that has been transformed into a special purpose computer through the inclusion of the set of logics 530. The set of logics 530 may be configured to handle video frames compromised by camera motion. Handling video frames compromised by camera motion may include deleting frames, preventing frames from being displayed, controlling how frames are displayed, controlling how a camera will acquire frames, controlling how a display will present frames, or other actions. Apparatus 500 may interact with other apparatus, processes, and services through, for example, a computer network.

Apparatus 500 may include a first logic 531. First logic 531 may be configured to produce motion data that describes how the video camera was moving while the video camera acquired members of the set of frames. The motion can be identified using data from various sensors or processes. For example, the motion data may be a function of gyroscopic data produced by the video camera or accelerometer data produced by the video camera. Additionally, the motion data may be a function of single frame motion analysis, or frame-to-frame motion analysis. The single frame motion analysis may, for example, identify motion artifacts, signal-to-noise ratio, or other factors. The frame-to-frame motion analysis may examine registration between objects, continuity between objects, or other factors. The motion data may include a per frame motion data or a per clip motion data. A clip is a set of related frames acquired within a pre-determined time period. In one embodiment, the motion data may describe actual movement of the camera (e.g., the user is waving the camera around) or may report apparent movement (e.g., the user is zooming in or out rapidly).

Apparatus 500 may include a second logic 532. Second logic 532 may be configured to control whether members of the set of frames are displayed as a continuous video display, as selected still frames, or not at all. Whether members will be displayed and whether members will be displayed as still frames or as a continuous video display may be based, at least in part, on the motion data. For example, members of a first series of frames that were acquired while the motion data did not satisfy a motion threshold may be presented in a first discrete display mode while members of a second series of frames that were acquired while the motion data did satisfy the motion threshold may be presented in a second continuous display mode. More generally, frames from a moving camera may be presented as a still image while frames from a camera that is not moving, or that is only moving a small amount, may be presented as a video.

In one embodiment, the second logic 532 is configured to selectively exclude individual members of the set of frames based on the per frame motion data. For example, while a series of frames may satisfy a continuity standard for collective movement in a series of frames, one or more individual members may not satisfy a viewing standard for an individual frame. The second logic 532 may also be configured to selectively exclude individual members of the set of frames based on the per clip motion data. For example, the per clip motion data may identify frames that contribute to an unacceptable continuity or blurring. The second logic 532 may also be configured to selectively exclude subsets of members of the set of frames based on the per clip motion data. For example, the per clip motion data may identify a series of frames that do not satisfy a continuity standard and may exclude the entire series.

Figure 6:
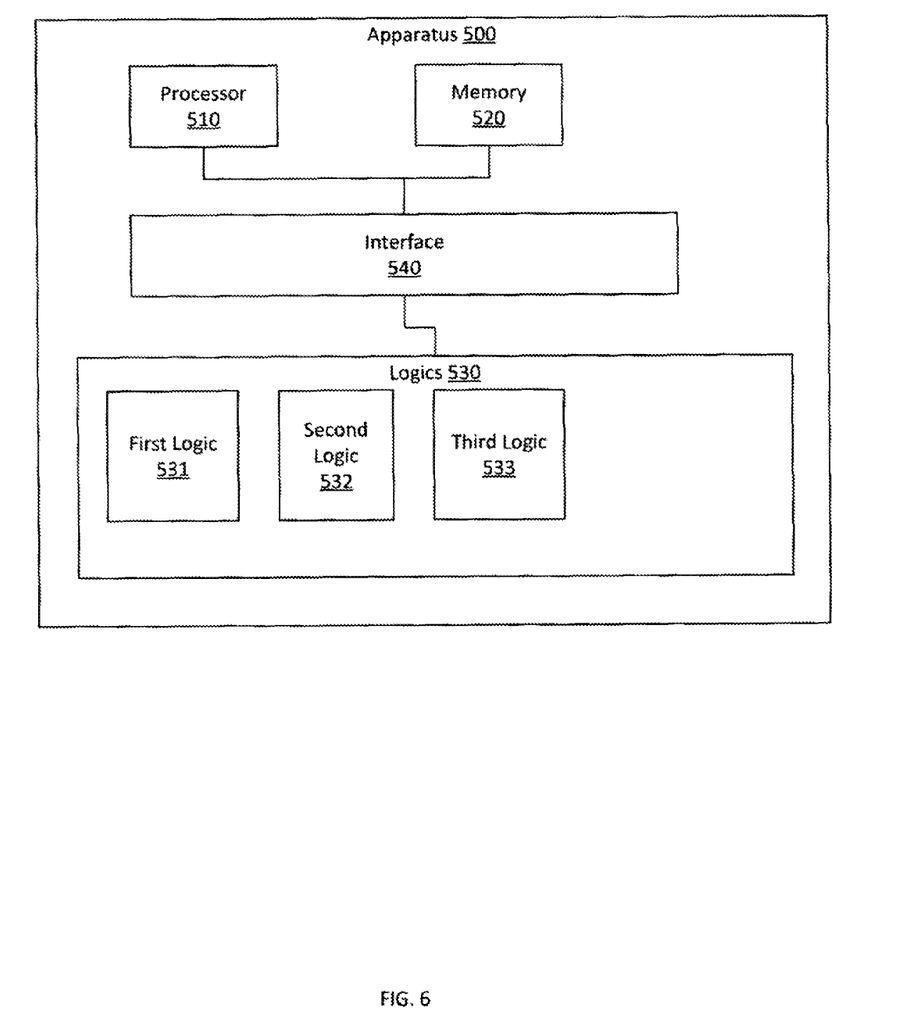
FIG. 6 illustrates an example apparatus associated with handling video frames compromised by camera motion.

FIG. 6 illustrates another embodiment of apparatus 500. This embodiment includes a third logic 533 that is configured to control a frame capture parameter for the video camera. The frame capture parameter may be, for example, a frame capture rate or shutter speed. Whether and how the frame capture parameter is adjusted may be based, at least in part, on the motion data. For example, if the camera is moving, then the camera may be adjusted to optimize the production of still frames. If the camera is not moving, then the camera may be adjusted to optimize the production of a contiguous series of frames for video display. In one embodiment, the third logic 533 may be configured to prevent the camera from capturing frames while the camera is moving. This may be achieved, for example, by setting the frame capture rate to zero.

Figure 7:
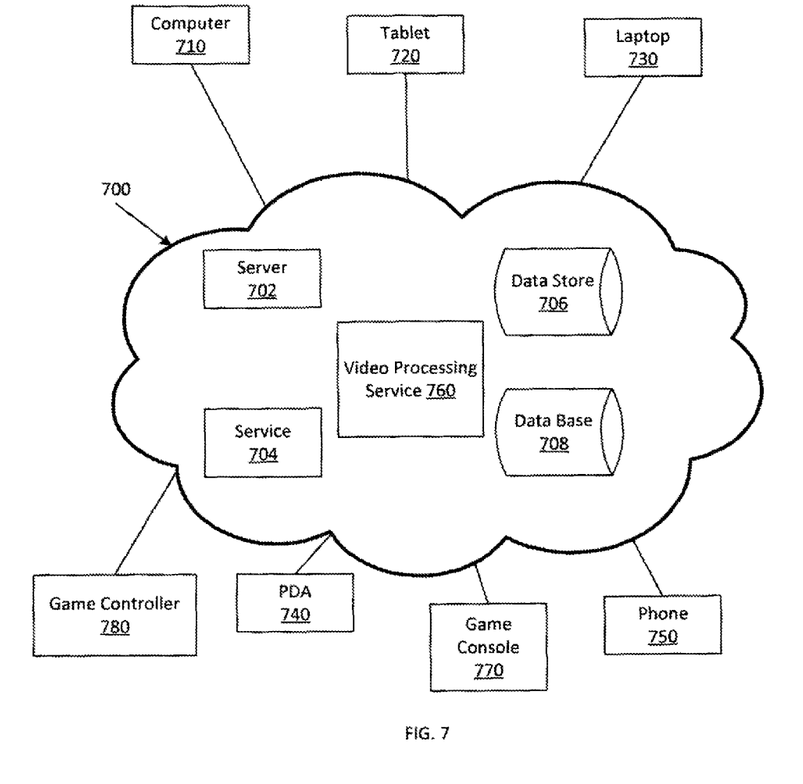
FIG. 7 illustrates an example cloud operating environment in which example methods or apparatus may handle video frames compromised by camera motion.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-F, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example video processing service 760 residing in the cloud. The video processing service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the video processing service 760. The video processing service 760 may identify frames that have been affected by, compromised by, or otherwise negatively impacted by camera motion. In one embodiment, the video processing service 760 may physically or logically delete these frames from a viewing stream. In another embodiment, the video processing service 760 may prevent frames from being displayed. In yet another embodiment, the video processing service 760 may control whether frames are displayed in a freeze-frame mode, in a slide show mode, in a video mode, or in other modes. The video processing service 760 may also control how a camera will acquire frames (e.g., optimized for video, optimized for still).

FIG. 7 illustrates various devices accessing the video processing service 760 in the cloud. The devices include a computer 710, a tablet 720, a laptop computer 730, a personal digital assistant (PDA) 740, a mobile device (e.g., cellular phone, satellite phone) 750, a game console 770, or a game controller 780. It is possible that different users at different locations using different devices may access the video processing service 760 through different networks or interfaces. In one example, the video processing service 760 may be accessed by a mobile device (e.g., phone 750) that captures video. The video processing service 760 may prevent some video from phone 750 from being displayed, stored, or transmitted. In another example, portions of video processing service 760 may reside on a mobile device (e.g., phone 750).

Figure 8:
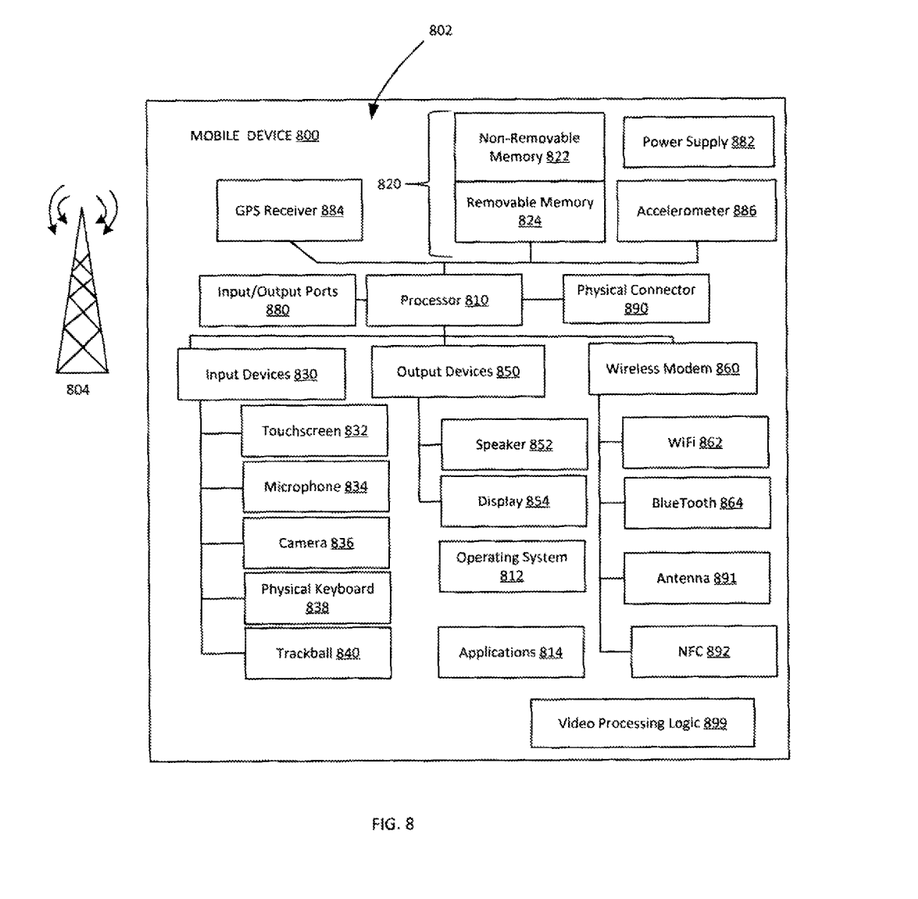
FIG. 8 is a system diagram depicting an exemplary mobile communication device configured to handle video frames compromised by camera motion.

FIG. 8 is a system diagram depicting an exemplary mobile device 800 that includes a variety of optional hardware and software components, shown generally at 802. Frames that are processed by the example methods, apparatus, and services described herein may be acquired by device 800. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include video capture, video processing, video display, mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include individual frames captured by a video camera, series of frames captured by a video camera, metadata about the frames, and other data. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a video processing logic 899 that is configured to provide a functionality for the mobile device 800. For example, video processing logic 899 may provide a client for interacting with a service (e.g., service 760, FIG. 7). Video processing logic 899 may determine whether frames acquired by a camera (e.g., camera 836) are suitable for viewing as a video or more suitable for viewing as selected still frames, or not suitable for viewing at all. Video processing logic 899 may rely on data from an accelerometer 866, gyroscope, or other sensor on device 800. Portions of the example methods described herein may be performed by video processing logic 899. Similarly, video processing logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" Indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory configured to store a set of frames acquired by a video camera; and
an interface configured to connect a processor and the memory, the processor to:
produce motion data that describes how the video camera was moving while the video camera acquired members of the set of frames, where the motion data is a function of gyroscopic data produced by the video camera, accelerometer data produced by the video camera, single frame motion analysis, or frame-to-frame motion analysis;
control whether members of the set of frames are displayed as a continuous video display or as selected still frames based, at least in part, on the motion data, where members of a first series of frames acquired while the motion data does not satisfy a motion threshold are presented in a first discrete display mode and where a second series of frames acquired while the motion data does satisfy the motion threshold is presented in a second continuous display mode; and
control whether members of the set of frames are displayed or not displayed based on a determination of whether each member exhibits less than a threshold amount of damage associated with camera motion, wherein the damage is to be calculated based on a signal-to-noise ratio.

2. The apparatus of claim 1, wherein the processor is to control a frame capture parameter for the video camera based, at least in part, on the motion data, where the frame capture parameter is frame capture rate or shutter speed.

3. The apparatus of claim 2, where the motion data comprises a per frame motion data or a per clip motion data.

4. The apparatus of claim 3, where the processor is to selectively exclude individual members of the set of frames based on the per frame motion data, to selectively exclude individual members of the set of frames based on the per clip motion data, or to selectively exclude subsets of members of the set of frames based on the per clip motion data.

5. The apparatus of claim 3, wherein the per clip motion data identifies frames that contribute to blurring.

6. The apparatus of claim 3, wherein the per clip motion data identifies a series of frames that do not satisfy a continuity standard.

7. The apparatus of claim 6, wherein the processor is to exclude the series of frames that do not satisfy the continuity standard.

8. The apparatus of claim 1, wherein the single frame motion analysis comprises identification of motion artifacts, a signal-to-noise ratio, or both.

9. The apparatus of claim 1, wherein the frame-to-frame motion analysis comprises an examination of a registration between objects, a continuity between the objects, or both.

10. The apparatus of claim 1, wherein the motion data reports apparent movement.

11. The apparatus of claim 1, wherein the memory is configured to store metadata associated with one or more frames of the set of frames.

12. The apparatus of claim 11, wherein the metadata comprises sensor data, motion analysis data, an include value, an exclude value, or any combination thereof.

* * * * *